Dec. 2, 1941.                W. P. UHLER                2,264,817
METHOD OF ELECTRICALLY SEVERING FLEXIBLE SHAFTING
Filed April 5, 1939
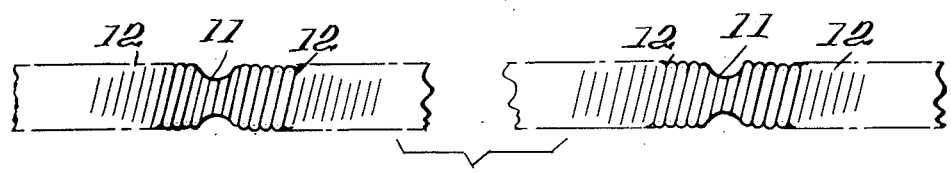
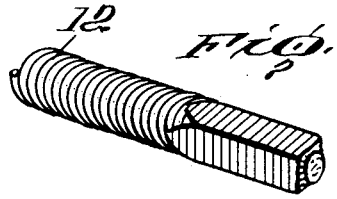
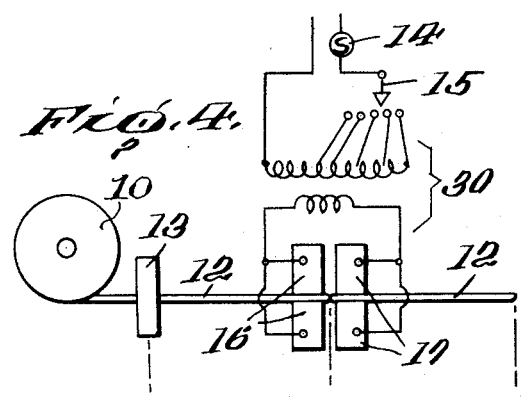
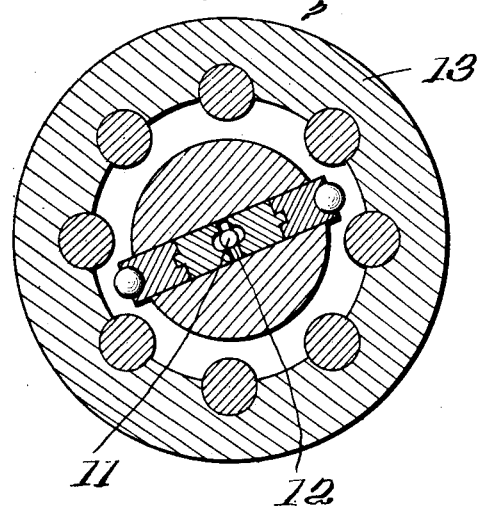
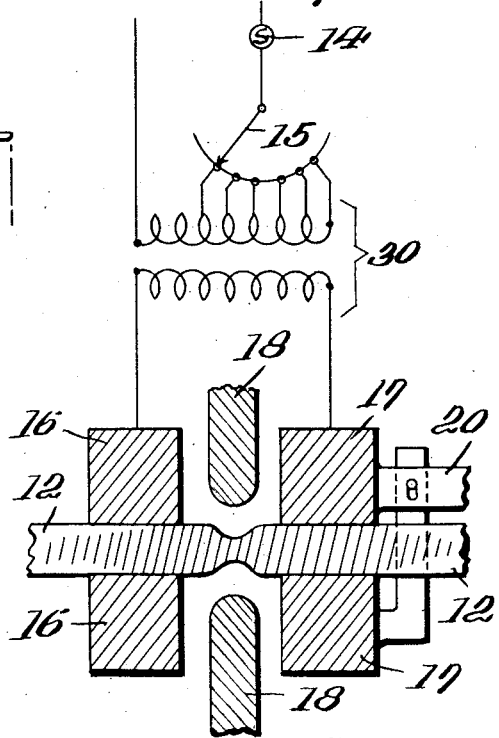
INVENTOR
Wilmer P. Uhler
By Clifton C. Hallowell
ATTORNEY Patented Dec. 2, 1941

2,264,817

UNITED STATES PATENT OFFICE 2,264,817

METHOD OF ELECTRICALLY SEVERING FLEXIBLE SHAFTING

Wilmer P. Uhler, Tottenville, N. Y., assignor to The S. S. White Dental Manufacturing Company, a corporation of Pennsylvania Application April 5, 1939, Serial No. 266,177

9 Claims. (Cl. 219—1)

This invention concerns a method of producing flexible shafts and like articles of predetermined lengths, and the articles produced thereby.

One feature of the invention is the production of such articles from flexible shafting and like fusible material which is composed of the usual elements which form strands or coils extending along the length of the material, usually being laid in a helical formation. Heretofore such articles have been severed by shearing or sawing or burning, but the ends so produced have tended to unwrap or fray out: it has also been proposed to cut them by the electric current. The cut ends usually had portions (sometimes called fins or burrs or heads) which projected beyond the original diameter or periphery of the material. It was then necessary to press or grind the material to eliminate such projecting portions, and difficulties and expense arose as the ends were not of uniform size and shape. According to the present invention, the severed ends have no such projection, and the individual elements have been fused together.

Another feature of the invention is the production of such articles by mechanically reducing the external periphery of the material and pressing the elements thereof into a compact mass, and passing an electrical current through the mass to fuse the same, whereby the compact condition of the mass assures a definite welding of the elements, and the reduced section assures that no fused material will extend beyond the original periphery.

A further feature is the production of flexible shafts or like articles in predetermined lengths by marking such lengths on a continuous length of material by necking the material, and then passing an electrical current through the neck portions to produce fusion thereat. As such materials often comprise tempered metal wires, it is desirable to avoid annealing these wires at points away from the ends, and this invention includes the utilization of currents of high intensity but low maximum terminal voltage, so that the current flow ceases immediately upon the fusion and severing of the material, and hence the heating effects are largely and efficiently confined to the neck portion, and no annealing or other heat change is produced even at points relatively close to the severed end.

With these and other features as objects in view, an illustrative manner of practicing the invention is shown on the accompanying drawing, in which:

Figure 1 is a view, showing a length of necked shafting.

Figure 2 is a similar view, showing the severed ends.

Figure 3 is a similar view, showing the end of a flexible shafting intended for power drive.

Figure 4 is a diagrammatic view of conventionalized structures for performing the method.

Figure 5 is a view showing a necking device.

Figure 6 is a conventionalized diagram of modified procedural steps.

In this drawing, the invention is illustratively applied to the forming of flexible shafts which are comprised of a succession of layers of wires coiled in different winding directions about a central core. Such shafts are usually made of tempered or cold-worked wires of steel, phosphor bronze, Monel metal, etc., for maximum strength, and are often provided with squared portions as driving connections at the ends, the diagonal of the square being substantially the diameter of the original external periphery in order that the shaft may easily be withdrawn from its usual enclosing sheath. Such shafts are preferably made by forming a continuous length of shafting in a suitable winding lathe, and rolling the shafting into a coil 10 as it is made. In making such shafts to standard specifications, including length, they must be cut from the continuous length, and are then provided with the specified driving connections.

According to this invention, the shafting is pressed, at the points which are to be severed for forming the ends of shafts, either in the winding lathe itself or as a separate operation. In Figure 1, the continuous length of shafting has been thus provided with the reduced portions or necks 11, 11, which are separated from one another by the desired length of the shaft 12 to be formed; and this length of shafting thus comprises the successive shafts 12, 12, 12. The pressing for forming the necks may be effected by any suitable arrangement which avoids the formation of fins, and which preferably compacts the elements into a mass of lesser external cross-section than the original periphery and usually concentric therewith. This can be effected by machines of the punching or swaging type which deliver a multiplicity of blows upon the material at the proper point. It is preferred to employ the punches in opposed pairs to avoid transverse deformations, and a rotary swaging die 13 (Figures 4 and 5) has been found an excellent instrument for accomplishing the purpose as no fins are left. The amount of reduction of external cross-section varies with the size and substance of the material to be worked. In some cases, a mere compacting so that the normal spaces between the elements are substantially closed is sufficient, but it is usually preferred to reduce the actual net cross-section of material, so that the electrical resistance is increased and a given intensity of current will quickly effect a fusion.

As shown in Figure 4, this current can be obtained from alternating current power mains, under control of a master switch 14 and a primary adjusting switch 15, with the employment of a current transformer 30 which preferably delivers a high current intensity and has a low maximum (open-circuit) terminal voltage to avoid arcing effects when severing occurs. The transformer secondary is connected to the electrode blocks 16, 16 and 17, 17 which are clamped upon the continuous length of material, in pairs at opposite sides of a reduced neck portion and preferably as close as possible to such neck portion; each block is of ample area to assure a conduction of current to the material without appreciable resistance or heating effects, and can serve to conduct away and dissipate heat from the contacted parts of the shafting.

When the switch 14 is closed, a heavy current flows between the pairs of electrodes 16, 16 and 17, 17 in a general axial direction along the shafting, and the resistance of the material, particularly at the neck portion, causes a temperature rise. As the material heats, its resistance usually rises and therewith the heating effect is more and more concentrated at the point of highest resistance, until fusion occurs. It is often desirable to vary the adjusting switch 15 so that the drop of amperage upon increased resistance may be overbalanced, and a quick fusion at the desired point is thereby effected without a lengthy application of current so that the heating is localized and does not spread to surrounding parts.

The molten material coalesces and forms an end face for each of the ends produced by the severing and then cools to provide an end having its elements sealed and welded together by fused and cooled material which remains within the original periphery or, in other words, the welded region is located wholly within the volume defined by a cylindrical jacket tangent to the outermost surfaces of the parts of the individual elements adjacent said reduced portion. As the clamps have gripped the shafting close to the neck portion, and the material has been mechanically distorted and compacted at and adjacent to the minimum section of the neck, there is no tendency for the elements to unwrap during severing. The fusion at the reduced portion causes a current interruption so that the heating ceases and the fused material rapidly cools to solid form before it has opportunity to pass outside the original periphery. For some types of small shafts this cooling is quickly effected by simple conduction along the metal and by the usual radiation and by air convection currents but, especially for large shafting or like articles and where it is necessary to limit strictly the heating of adjacent parts, it is desirable to provide positive cooling, as by having water-cooled clamp blocks or electrodes of ample contact area, or by use of a current of air or other fluid directed over the fused material.

Each end may thereafter be swaged to provide a driving connection as shown in Figure 3, in which the square end has a diagonal equal to the diameter of the original periphery, or a cross-section of about five-eighths of the original. Owing to the voids between the wire elements of the original material, this can usually be accomplished by cold swaging to close the voids and without extensive elongation of the shaft, which then has its end face formed by the welded joint connecting the elements of the mass. The axial length of such a welded region may be made very short by proper control of the necking operation and of the current intensity and time of severing.

It will be understood, however, that this particular formation of a driving connection concerns only one manner of practicing the invention, considered in its broader aspect, and that it is likewise possible to utilize the successive severed lengths with other types of couplings or so-called fittings. Thus, sleeves of appropriate type for driving connection may be placed over the severed ends and secured thereto by soldering, sweating or swaging of a ferrule portion of the sleeve, and likewise fittings may be held in place by set screws. In all of these cases of forming the driving connections, the present method and the article produced thereby has the advantage that the welded region secures the various individual elements together and the fused material remains within the original periphery so that there is no need to incur the expense of an extra operation of grinding off any projecting blob of fused material, nor is there any danger of loosening wires by such a grinding operation. Furthermore, the welded ends are fixedly held so that there is no necessity of employing a tinning operation as a step for holding the elements together.

It is also possible to proceed as in Figure 6 by employing punches 18 to produce a mechanical necking of the material while it is held by the clamp electrodes 16, 16 and 17, 17. By this means, it is feasible to produce the necking and severing action at a single station so that by appropriate successive actuation of the necking punches and of the circuit closer for the electrical circuit, the operation is accomplished simply and quickly, in a manner which is especially appropriate for a single-machine operation. When the switch 14 is closed, current flows to produce the fusion. In some instances of employment it is desirable to perform pressing operations by the punches 18 around the periphery, alternately with applications of the current to effect annealing of the parts which are to form the neck, and thereby obtain a more easy mechanical reduction to a smaller size and ultimately a fusion at a small cross-section.

A further modification is also shown in Figure 6, in which the clamp electrodes 17, 17 are connected to a bar 20 by which tension is exerted after the material has been softened or annealed so that the material is drawn out and the fusion occurs at the minimum section of the drawn portion, with the result of uniting all elements together thereat. The clamp electrodes are preferably located close together but not in electrical contact when they are first brought into engagement with the flexible shafting or other article to be severed. A flow of current is then produced so that the short length of shafting between the electrode blocks becomes heated and then is drawn out mechanically to reduce the diameter and to form the neck, and this drawing operation may be performed without utilization of the punches 18. The current intensity may be increased, after drawing down to reduce the diameter, for effecting the final fusion and severance.

While the invention has been illustratively described in conjunction with flexible shafting, it can also be employed in other instances with like fusible materials where a severing and welding is desirable: and in many other ways within the scope of the appended claims.

I claim:

1. The method of severing flexible shafting and like fusible materials, which comprises mechanically forming a groove extending around the periphery of the material to provide a neck or reduced portion at the point to be severed, and therewith pressing the elements into a compact mass and passing an electrical current of high intensity through the neck for effecting a rapid fusion and coalescence and severing of the material and therewith a cessation of the electrical current.

2. The method of severing flexible shafting and like fusible material and securing the elements thereof at the severed ends, which comprises mechanically pressing the material at its periphery and thereby necking the material at the point to be severed by forming a continuous peripheral groove therein and compacting the material thereat, and passing an electrical current through the necked point for effecting a fusion of the material thereat and therewith producing a severing of the material and a welding of the elements at the severed ends while retaining the fused material within the original periphery.

3. The method of severing flexible shafting and like fusible material and securing the elements thereof at the severed ends, which comprises swaging the material at the point to be severed for forming a groove extending continuously around the periphery for reducing the cross-section thereof and pressing the elements into a compact mass, passing an electrical current through the necked point for effecting a fusion of the material thereat and therewith producing a severing of the material and a welding of the elements at the severed ends, and interrupting the current flow and cooling the fused material before the same passes outside of the original periphery.

4. The method of forming an end of a flexible shaft which comprises mechanically reducing the external circumference of a length of flexible shafting to form a continuous peripheral groove therein and to press the elements of the shaft into a compact mass at a point at which the end is to be formed, passing an electrical current along at least a part of the shafting including the reduced portion thereof whereby to produce fusion of the material at the reduced portion and therewith a severing of the shafting at such portion, and then forming an end produced by the severing to provide a driving connection.

5. The method of producing an end of a flexible shaft composed of individual coiled elements, which comprises mechanically reducing the external circumference of a length of flexible shafting to form a continuous peripheral groove therein and to press the elements of the shaft into a compact mass at a point at which the end is to be produced, passing an electrical current along at least a part of the shafting including the reduced portion thereof and thereby effecting a fusion of the material at the reduced portion with a severing of the shafting and a welding of the individual elements thereat, cooling parts of the shaft adjacent the groove during the course of the heating of the reduced portion, and interrupting the current flow, and cooling the fused material before the same passes outside of the original periphery.

6. The method of severing flexible shafting and like fusible material and securing the elements thereof at the severed ends, which comprises successively mechanically pressing upon the periphery of the material at the point to be severed whereby to produce a continuous peripheral groove and thereby to reduce the external cross-section, and alternately passing an electrical current axially through the reduced portion between pressing operations, until fusion of the reduced portion occurs and the elements of the shafting are welded together at the severed ends produced by the fusion.

7. The method of severing flexible shafting and like fusible material and securing the elements thereof at the severed ends, which comprises mechanically pressing upon the periphery of the material at the point to be severed whereby to effect a substantially concentric reduction of the external cross-section and pressing the elements into a compact mass, and passing an electrical current through the reduced portion for effecting a fusion of the reduced portion and effecting cooling with retention of the fused matter within the original periphery of the material and wherewith the fused matter effects a welding together of the elements of the material.

8. The method of severing flexible shafting and like fusible material having elements of tempered metal and securing the elements thereof at the severed ends, which comprises mechanically reducing the external cross-section of the material to form a continuous peripheral groove therein and to press the said elements into a compact mass at the point to be severed, passing a high intensity electrical current of low maximum terminal voltage through the reduced portion for effecting a quick fusion of the reduced portion and a welding together of the elements of the material, cooling parts of the shaft adjacent the groove during the course of the heating of the reduced portion, and effecting a cessation of the current prior to substantial heating of the material adjacent the reduced portion.

9. The method of severing flexible shafting and like fusible materials, which comprises mechanically pressing the material for forming a peripheral groove in the material to provide a neck or reduced portion at the point to be severed and to press the elements of the material into a compact mass, and passing an electrical current through the neck for effecting a fusion and severing of the material, and exerting traction upon the material in the neck whereby to draw it out while being heated.

WILMER P. UHLER.